United States Patent Office 3,198,754
Patented Aug. 3, 1965

3,198,754
AZIRIDINE DERIVATIVES AND POLYMERS THEREOF
Arthur H. Ahlbrecht, Dellwood, and Thomas S. Reid, New Canada Township, Ramsey County, Minn., assignors to Minnesota Mining and Manufacturing Company, St. Paul, Minn., a corporation of Delaware
No Drawing. Filed Jan. 2, 1962, Ser. No. 163,915
6 Claims. (Cl. 260—2)

This application is a continuation-in-part of application Serial No. 752,436, filed August 1, 1958, now abandoned.

This invention relates to polymerizable compositions and particularly to highly fluorinated derivatives of aziridines, polymers derived therefrom and methods for their preparation.

It has heretofore been known to prepare amides of highly fluorinated acids as described, for example, in U.S. Patent No. 2,567,011, as well as polymerizable acrylic acid derivatives from 1,1-dihydroperfluoroalkylamines as described in U.S. Patent No. 2,743,297. However, although these fluorinated acrylamides are polymerizable by virtue of their unsaturated nature, so far as is presently known no polymerizable aziridine derivatives of highly fluorinated acids have been available heretofore.

The aziridine derivatives of this invention as a class are quite distinct from the simple non-polymerizable amides heretofore known, since aziridine derivatives exhibit markedly different behavior owing to the heterocyclic nature of the aziridine ring which leads to their classification as derivatives of ethylenimine rather than of the simple aliphatic and aromatic amides.

It is the object of this invention to provide polymerizable fluorochemical substances derived from highly fluorinated monocarboxylic acid derivatives of aziridines. A further object is to provide fluorine-containing polymers. Another object is to provide processes for the production of the said aziridine derivatives and their polymers. Other objects will become apparent from the disclosure hereinafter made.

In accordance with the above and other object of this invention, it has been found that polymerizable highly fluorinated derivatives of aziridines are readily prepared by reaction of highly fluorinated monocarboxylic acid derivatives with aziridine or homologs thereof.

As used herein, the terms "aziridines" and "aziridides" refer respectively to ethylenimine and homologous lower alkyl derivatives thereof, and to compounds derived from aziridines by substitution of an acyl group for the active hydrogen atom on the nitrogen atom of the aziridine ring. However, while approved standard nomenclature requires the use of these terms, it is recognized that the aziridines are alternatively named as alkylenimines, for example, ethylenimine, 1,2-propylenimine; 1,2-butylenimine and the like.

While the reaction of aziridines with acyl halides of certain hydrocarbon monocarboxylic acids has heretofore been known and is moderately successful under carefully controlled conditions, it is surprising to find that the presence of a highly fluorinated radical does not prevent this condensation, since fluorochemical acids of this type are often very strong acids which might be expected to produce untoward results such as extensive homopolymerization of the aziridines. Additionally, it has been found that the presence of the highly fluorinated radical apparently makes possible the reaction of aziridines with certain fluorinated radical-containing esters in excellent yield.

The portion of the molecule of the acyl group-containing starting materials herein employed which is concerned with the reaction is the acyloxy group, and the highly fluorinated portion can be any highly fluorinated radical having a terminal perfluoromethyl group, which does not contain groups which will react with alkylenimines. Such a radical preferably contains from 3 to 17 fully fluorinated carbon atoms.

Generally speaking, fluorinated derivatives of aziridines can be prepared by the reaction of a highly fluorinated monocarboxylic acid halide with the selected aziridine. This process is illustrated by the following equation in which the fluorocarbon reactant is exemplified by a general formula:

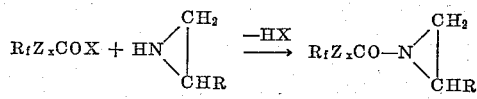

wherein $R_f$ is a perfluoroalkyl radical, Z is a linking group containing not more than one carbon-to-carbon unsaturation, $x$ is 0 or 1, X is a halogen atom and R is hydrogen or a lower alkyl group.

In carrying out the process, the reactants are brought together in a mutual inert solvent such as ether, in stoichiometric proportions, while maintaining the temperature of the resulting exothermic reaction at or below about 25° C. The hydrogen halide by-product is removed as it is formed, for example, by use of a buffering agent in a two-phase system. The product is readily isolated simply by removing the solvent, inasmuch as the reaction appears to be substantially quantitative in most cases.

When esters are employed as starting materials in a preferred process of the invention, the reaction proceeds according to the equation:

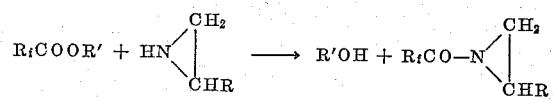

wherein $R_f$ is a highly fluorinated radical such as a straight chain or cyclic saturated perfluoroalkyl radical, R' is an esterifying radical, and R is hydrogen or a lower alkyl radical. The preferred process of this invention is particularly convenient and effective in accomplishing the objects hereof in that the aminolysis reaction is readily controllable and does not give rise to acidic by-products.

The results obtained are generally superior to those in which an acyl halide is employed. For example, the monomers are obtained in substantially quantitative yield and practically pure state directly from the reaction mixture, without further purification, and when thus obtained can be used to treat cloth to render it water and oil-repellent to an extent which is not possible with processes employing acid halides for production of the monomers.

The process is carried out to produce perfluorocarbon radical-containing aziridine derivatives of the present invention by reacting the methyl, ethyl, propyl, butyl or other lower alkyl ester of the selected highly fluorinated acid, conveniently in an inert organic solvent, with at least a stoichiometric amount of aziridine or a lower alkyl derivative thereof such as methylaziridine, ethylaziridine or propylaziridine. The resulting reaction tends to be exothermic and heating is not ordinarily required. If it is desired to isolate the monomer care should be exercised to prevent the reaction temperature from reaching a point at which polymerization of the product occurs, suitably by ordinary cooling means, or by dilution of the reactants. The reaction appears to be substantially quantitative and takes place very rapidly. The resulting monomeric aziridine derivatives can be isolated if desired, or can be readily polymerized, even directly from the reaction mixture, to produce polymer comprising the recurring units as set forth below.

The monomeric compounds of the invention can be considered as aziridine derivatives of highly fluorinated organic monocarboxylic acids. They vary in properties from oily liquids to waxy or crystalline solids which are generally soluble in ether and insoluble in water and many organic solvents. They are readily polymerizable by heating at temperatures upwards of about 100° C., to produce useful polymeric and copolymeric substances comprising recurring groups which can be represented by the structure:

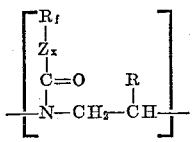

in which, however, the R substituent may be attached to the carbon atom adjacent to the nitrogen atom, rather than as shown.

The polymers coming within the scope of the invention can contain recurring units averaging from at least 10 to 100 or more in number. Such polymers are solid substances which are soluble in esters of perfluorocarbon acids and insoluble in water and hydrocarbon solvents and which have valuable properties. They are useful for the treatment or finishing of fibrous webs, such as cloth, paper, felt and the like, as well as less porous surfaces such as ceramics, glass fibers and the like, to confer oil and water resistance upon these materials. Some of these polymers are found to be particularly useful for the treatment or finishing of cotton cloth to confer on it resistance to oil staining and repellency to water. They are applied in solution, suspension or are formed in situ to provide a firmly adherent finish. Other uses will be apparent from the properties of the polymers, which are thermoplastic, resinous materials. They may be fabricated into various shapes by cutting or sawing, or may be molded or cast with the aid of heat.

Polymerized aziridine derivatives of this invention can also be formed by the acylation of a polyalkylenimine, e.g., with the acid halides of the fluorocarbon acids employed herein in the presence of a base such as pyridine, thereby achieving substantial acylation of the available imino groups of the polymer backbone.

The compounds of the invention include highly fluorinated organic monocarboxylic acid derivatives of aziridines. The highly fluorinated organic acid derivatives which can be employed as starting materials for their production may be somewhat more specifically represented by the formula:

wherein $R_f$ represents a perfluoroalkyl radical, $x$ is 0 or 1, X is a member of the group consisting of halogen atoms, and alkoxy radicals of the formula $OR'$, $R'$ being a lower alkyl radical, and Z is a divalent linking group of the class consisting of:

—$(CH_2)_n$—
—$CH_2$—$CHCl$—$(CH_2)_m$—
—$O$—$(CF_2)_2$—
—$CF=CR'_f$—
—$CR'_fH$—, and
—$SO_2$—$NR''$—$(CH_2)_m$— wherein $R'_f$ is a member of the group consisting of lower perfluoroalkyl groups and fluorine, $R''$ is a member of the group consisting of hydrogen and lower alkyl radicals, $n$ is an integer from 3 to 14 and $m$ is an integer from 1 to 12. It will be noted that R and $R''$ may be the same or different.

It is to be noted that it is within the scope of the invention to employ carbon-containing linking groups of straight-chain structure and containing no more than one carbon-to-carbon unsaturation. The presence of a stable, non-hydrolyzable group, as, for example, an oxa group or ether oxygen in the linking group is also contemplated. The monomers which have no linking groups and those which have the straight-chain groups connecting the fluorinated group and the acyl group are herein collectively referred to as aziridine derivatives of highly fluorinated organic monocarboxylic acids.

Compounds of this invention which contain a linking group such as the above can be prepared by the above-described methods, i.e., by reaction of an alkylenimine with the selected acid chloride or fluoride, as well as by acylation of a polyalkylenimine.

Examples of highly fluorinated organic monocarboxylic acid derivatives of aziridines which are included within the scope of the invention, in which a linking group connects the fluorocarbon residue to the acyloxy group, are the aziridine and lower alkylaziridine derivatives of:

4-perfluoropropylbutyric acid
7-perfluoroamylheptanoic acid
6-perfluorododecylhexanoic acid
Omega-perfluorobutylmyristic acid
9-perfluorooctylnonanoic acid
5-perfluorooctylpentanoic acid
11-perfluorooctylhendecanoic acid
12-perfluorooctyldodecanoic acid
8-perfluorocyclohexyloctanoic acid
3-chloro-4-perfluoropropylbutyric acid
6-chloro-7-perfluoroamylheptanoic acid
5-chloro-6-perfluorododecylhexanoic acid
13-chloro-omega-perfluorobutylmyristic acid
8-chloro-9-perfluorooctylnonanoic acid
4-chloro-5-perfluorooctylpentanoic acid
10-chloro-11-perfluorooctylhendecanoic acid
11-chloro-12-perfluorooctyldodecanoic acid
7-chloro-8-perfluorocyclohexyloctanoic acid
Perfluoromethoxypropionic acid
Perfluoroethoxypropionic acid
Perfluoropropoxypropionic acid
Perfluorobutoxypropionic acid
Perfluoropentoxypropionic acid
Perfluorooctoxypropionic acid
Perfluorocrotonic acid
Perfluoro-$a$-methylcrotonic acid
$a$-Hydroperfluoropropionic acid
$a$-Hydroperfluoro-$a$-methylpropionic acid
$a$-Hydroperfluorobutyric acid
N-propyl-2-perfluorooctanesulfonamido acetic acid
N-methyl-2-perfluorobutanesulfonamido acetic acid
N-ethyl-11-perfluorododecanesulfonamido undecanoic acid
N-ethyl-2-perfluorooctanesulfonamido acetic acid
and the like.

The compounds of the invention which can be represented by the structure:

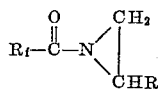

in which $R_f$ is a perfluorocarbon radical directly attached to the carboxyl group offer some advantage in their high percentage fluorine content over compounds in which a linking group is present. The highly fluorinated acyl groups are derived from the perfluoroacids having from about 3 to 17 carbon atoms in a saturated straight and/or cyclic alkyl chain directly attached to the carboxyl group. Aziridine derivatives of such acids which are embodiments of the invention include, for example, aziridine derivatives of perfluoroacrylic, perfluoromethacrylic, perfluoropropionic, perfluorobutyric, perfluorovaleric, perfluorocaproic, perfluoroenanthic, perfluorocapric, perfluorolauric, perfluoromyristic, perfluorocyclohexanoic acid and the like. As stated above, these acids may be employed as their esters, acyl chlorides or acyl fluorides and for the purposes of the invention are generally similar in their behavior to those acids in which no linking group is present.

It will be apparent that the compounds of this invention show great variation in the number of hydrogen atoms present in the fluorocarbon residue; that is, from none to as many as 20 or more and for this reason these polyfluorinated compounds may be called "highly fluorinated"; but they are not in every case perfluorinated. If the compounds of the invention are to be useful in treatments to promote oleophobicity and water repellency, for example, of cloth, it is important that the terminal carbon atom be fully fluorinated, for example, trifluoromethyl group; and at least three such fully fluorinated carbon atoms are preferred as, for example, a perfluoropropyl group. Specific additional advantages to the use of any linking group will be apparent for particular purposes; thus oxygen atoms tend to promote flexibility of the polymers at lower temperatures, methylene groups will decrease the degree of fluorination, etc.

Methods for the preparation of the acids and their acyl halides and esters, from which the aziridine derivatives of this invention can be prepared, are described in U.S. Patents Nos. 2,567,011; 2,713,593; 2,795,601; 2,803,656; 2,862,024; 2,951,051; and 2,965,659.

Esters of perfluoroalkanoic acids, which are used as starting materials in the preferred process of the invention, are readily prepared by any of several methods. For example, these esters can be prepared by interaction of an excess amount of an alcohol, for example, ethanol, with the selected fluorocarbon acid, in the presence of a solvent which forms an azeotrope, such as benzene, under conditions of azeotropic removal of water. The method described in United States Patent No. 2,567,011, in which the acid fluoride is reacted with an alcohol, is also suitable. The particular ester which is employed is not critical, as the alkyl substituent is eliminated as an alkanol during the reaction, but it will be recognized that propyl, butyl or higher alkyl esters may be somewhat less desirable starting materials because the higher alkanols thereby formed are more difficult to remove from the aminolysis reaction mixture.

Having thus described the invention in broad general terms, it is now more specifically illustrated by examples showing the best mode contemplated for practicing the invention. It will be understood that these examples are illustrative of the invention and are not intended to limit the scope thereof. In these examples all parts are by weight, temperatures in degrees centigrade and pressures in mm. of mercury unless otherwise specified.

Example 1

A mixture of 175 parts of ethanol, 674 parts of perfluorocaprylic acid and 400 parts of benzene is azeotropically distilled until about 410 parts of azeotrope have collected. This should contain the theoretical amount of water. The residue is then fractionally distilled in vacuo and the portion boiling at about 168° C. and 742 mm. Hg is collected.

To 4.42 parts of ethyl perfluorocaprylate thus prepared is added 0.5 part of ethylenimine. The exothermic reaction which begins immediately raises the temperature of the aminolysis reaction mixture to about 40° to 50° C. After about 5 minutes, the reaction mixture comprises N-(perfluorocapryloyl)-aziridine, which can be recovered in substantially pure form by removing the ethanol formed in the reaction. However, for use in cloth treatment it is not necessary to isolate the monomer, inasmuch as polymeric N-(perfluorocapryloyl)-aziridine can be prepared on the cloth to be treated directly from the aminolysis reaction mixture which produced the monomer. The N-(perfluorocapryloyl)-aziridine reaction mixture is diluted with ethanol and the resulting solution is applied to cotton jeans cloth. After soaking the cloth with the ethanolic solution, the ethanol is removed by evaporation and the dried cloth is heated for 5 minutes at about 125° C. thereby polymerizing the N-(perfluorocapryloyl)-aziridine and fixing the treatment on the cloth. The cloth samples are found to be oil- and water-resistant when the N-(perfluorocapryloyl)-aziridine is applied using ethanolic solutions of from about 1 to about 5 percent concentrations.

By employing ethanolic solutions of N-(perfluorocapryloyl)-aziridine at concentrations of about 0.2 to 3 grams per 100 ml. of solution to treat cotton cloth as above it is found that at concentrations as low as 0.3 g. per 100 ml. resistance to oil is obtained on curing for from 5 to 30 minutes. However, using higher concentrations, the resistance to oil is better and is retained after successively laundering with water and soap and dry cleaning with Stoddard solvent thus showing the retention of desirable properties of fibrous materials finished with polymeric products of the invention.

Example 2

To a solution of 4.3 parts of ethylenimine in 40 parts of ether cooled in an ice bath are added 22.8 parts of methyl perfluorobutyrate and the solution is then allowed to warm to room temperature during about ½ hour. The resulting ethereal solution comprises N-(perfluorobutyryl)-aziridine which is obtained as a syrupy liquid by evaporation of the solvent ether and the methanol formed during the reaction.

The syrupy aziridide is heated at about 110° C. for ½ hour in an aluminum dish and forms a clear, slightly yellowish, somewhat brittle resin. Further heating for about 2 hours at 110° C. results in a clear, tan colored, brittle resin which softens at about 45° C. The polymer comprises recurring units having the structure:

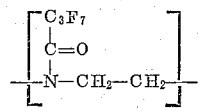

It is soluble in acetone but not appreciably soluble in either benzene or the cyclic fluorocarbon ether having the empirical formula $C_8F_{16}O$. (The latter compound is described in U.S. Patent No. 2,644,823.) Other resinous materials comprising these recurring units are formed when substances such as formaldehyde, urea, ethylenimine and the like are present during the polymerization. These polymers are low melting and soften at about 30° to about 50° C. and are very suitable for cloth-treatment or finishing.

Example 3

An ethereal solution of N-(perfluorocapryloyl)-aziridine is prepared by the procedure described in Example 2 using equimolar quantities of ethylenimine and ethyl perfluorocaprylate. By evaporation of the ethereal solution, the N-(perfluorocapryloyl)-aziridine is obtained as a waxy semi-solid substance which is soluble in certain organic solvents such as ether, acetone, alcohols and the like and in fluorochemicals and is insoluble in water and hydrocarbon solvents. It is polymerized as above by heating. The polymer obtained from monomeric N-(perfluorocapryloyl)-aziridine is a hard resin which softens at about 45° C. Fabrics treated with it as described above are rendered oil and water repellent. In solution in dioxane the monomeric aziridide polymerizes readily and the polymer precipitates. The polymer is not soluble in peanut oil because of its oleophobic properties.

A characteristic property of the aziridides of this invention is shown by analytical values obtained in nitrogen and fluorine analyses, which are often found to indicate the presence of more than the expected ratio of nitrogen to fluorine. It appears that under certain conditions, such as where a sufficient excess of ethylenimine is used, there is a tendency for the aziridide to retain an additional molecule of ethylenimine.

*Example 4*

When N-(perfluorocapryloyl)-aziridine is formed from perfluorocaprylic acid chloride and ethylenimine in the presence of an equimolar quantity of triethylamine, the product appears to retain a molar equivalent of triethylamine, in addition to the expected aziridide as shown by nitrogen analysis. This product also confers resistance toward oil staining upon cotton cloth.

*Example 5*

The process of Example 2 is repeated, except that to a solution of 4.3 parts (0.1 mole) of ethylenimine in 40 parts of ether are added 52.8 parts (0.1 mole) of methyl perfluorodecanoate, prepared according to the method of U.S. Patent No. 2,567,011 and boiling at about 193° C. After evaporation of the ether and methanol, a viscous liquid residue remains which comprises N-(perfluorodecanoyl)-aziridine.

On heating at 150° C. for about 1 hour, the N-(perfluorodecanoyl)-aziridine forms a clear solid which is thermoplastic.

*Example 6*

The procedure of Example 2 is repeated, except that a solution of 0.1 mole of ethylenimine in 50 ml. of ether is added to 0.1 mole of methyl perfluorocaproate, boiling at about 122° C. After removal of the ether and methanol from the reaction mixture by evaporation under reduced pressure, a syrupy residue of N-(perfluorocaproyl)-aziridine is obtained.

When N-(perfluorocaproyl)-aziridine is heated to about 125° C. for about 1 hour, a thermoplastic polymer is formed.

*Example 7*

The procedure of Example 2 is repeated, except that to a solution of 4.3 g. (0.1 mole) of ethylenimine in 50 ml. of ether, maintained below about 25° C. by use of an ice bath, there are added 23 g. (0.1 mole) of methyl perfluoromethoxypropionate. After evaporation of the solvents, there remains N-(perfluoromethoxypropionyl)-aziridine, represented by the formula:

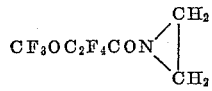

a soft, waxy solid, which upon heating to a temperature in the range of about 100–130° C. for about 2 hours produces a thermoplastic resinous polymer.

*Example 8*

The process described in Example 6 is repeated, except that in place of methyl perfluoromethoxypropionate there are employed 39.4 parts (0.1 mole) of methyl perfluoro-n-butoxypropionate, boiling at about 133° C. Following evaporation of the solvents from the mixture, there is obtained as a viscous, oily liquid N-(perfluoro-n-butoxypropionyl)-aziridine, having the formula:

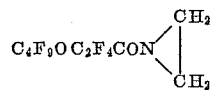

When this product is heated to about 150° C. for about 1 hour, a thermoplastic polymer is obtained which varies from clear and colorless to somewhat brownish and translucent depending upon the purity of the starting materials.

*Example 9*

To 2.2 parts of ethylenimine in a vessel fitted with stirrer, reflux condenser and dropping funnel and cooled in an ice bath are added 22 parts of ethyl perfluorocaprylate with stirring while maintaining the temperature below about 25° C. An exothermic reaction occurs and the reaction mixture is stirred for about 2 hours and evaporated under reduced pressure to give an oily residue of N - (perfluorocapryloyl) - aziridine. Elemental analysis shows the presence of 3.25 percent nitrogen, as compared with the calculated value of 3.19 percent. The monomer is best stored at temperatures of about 0° to 15° F. or lower to avoid polymerization.

A 2 percent solution of N-(perfluorocapryloyl)-aziridine in ethanol is applied to cotton, dried and heated about 15 minutes at about 120° C. The cloth is thereby made both oleophobic and hydrophobic. This procedure is generally applicable to the monomers of the invention to produce adherent deposits of polymer.

*Example 10*

In a vessel provided with stirrer, thermometer and dropping funnel and cooled externally by an ice bath are placed 34.5 parts (0.25 mole) of anhydrous potassium carbonate, 300 parts of water and 12.9 parts (0.3 mole) of ethylenimine. The solution resulting after stirring is cooled to about 15° C. and a solution of 124.5 parts (0.2 mole) of the acid chloride of 11-perfluorooctylhendecanoic acid in about 500 parts of diethyl ether is added gradually maintaining the temperature below 15° C. The reaction mixture is permitted to stand for about 1 hour. Then the ethereal solution is separated, dried over sodium hydroxide pellets at about 0° C. for one hour and the ether removed under reduced pressure to provide a residue of rather viscous N-(11-perfluorooctylhendecanoyl)-aziridine.

When the above procedure is repeated using the acid halides of perfluoroacrylic acid, 10-chloro-11-perfluorooctylhendecanoic acid, perfluorocrotonic acid and α-hydroperfluoropropionic acid, there are obtained, respectively, N-(perfluoroacryloyl)-aziridine, N-(10-chloro-11-perfluorooctylhendecanoyl) - aziridine, N - (perfluorocrotonoyl)-aziridine and N-(α-hydroperfluoropropionyl)aziridine. These monomers are each found to be applicable to cotton cloth as ethanolic solutions. Cloth thus treated and heated for about 15 minutes at about 100° to 130° C. is found in each case to be repellent to oil and water.

*Example 11*

To a solution of 5.7 parts (0.1 mole) of 1,2-propylenimine in 40 parts of ether cooled in an ice bath are added 22.8 parts of methyl perfluorobutyrate and the solution is allowed to warm to room temperature over a period of about ½ hour. After standing at room temperature for about 1 hour longer to insure completion of the reaction, the mixture is evaporated under reduced pressure to remove the ether and the methanol formed in the course of the reaction. The residue, a colorless, viscous liquid, consists of N-(perfluorobutyryl)-methylaziridine.

The N-(perfluorobutyryl)-methylaziridine can be used to treat cotton cloth to produce water and oil repellency as follows: The aziridide is dissolved in a sufficient amount of alcohol to make a concentration of about 5 percent N-(perfluorobutyryl)-methylaziridine. This solution is padded upon cotton cloth, such as a thoroughly washed muslin, and the alcohol is removed by evaporation. The cloth is then heated at a temperature of about 125° C. for about one hour. A water and oil-repellent finish is thus produced upon the cloth.

When N-(perfluorobutyryl)-methylaziridine is heated for about 1 hour at about 125–150° C., a solid thermoplastic polymer is formed, which may be clear or somewhat translucent.

When the procedure of this example is repeated, using stoichiometric amounts of 1,2-butylenimine or 1,2-pentylenimine instead of the 1,2-propylenimine, there are obtained, respectively, N-(perfluorobutyryl)-ethylaziridine and N-(perfluorobutyryl)-propylaziridine. These monomers, which are also heavy, rather viscous liquids as obtained from the reaction mixture, are polymerized by heating.

*Example 12*

A further method for the preparation of the polymers of this invention is by acylation of a polyethylenimine as illustrated in this example.

Polyethylenimine is prepared by addition of a trace of acid to a 50 percent aqueous solution of ethylenimine which is then dried under reduced pressure to a heavy residue. To 26 parts of an 8.2 percent solution of the dry polyethylenimine in pyridine are added 300 parts of benzotrifluoride followed by 21.6 parts of perfluorocaproyl chloride added in small portions with stirring, over about ½ hour. The temperature of the reaction mixture which contains considerable solid (pyridine salt), is then about 45° C. The mixture is filtered through glass-wool and there is obtained an about 5 percent by weight solution of acylated polyethyleneimine in benzotrifluoride and pyridine. Evaporation of a portion under vacuum provides the fluorine-containing acylated polymer as a rather brittle mass. Analysis shows the presence of 55.6 percent of fluorine, which is about 86 percent of the amount required for complete acylation. Surprisingly this is achieved by acylation of about 37 percent of the total number of secondary amino groups of the polyethylenimine. The polymer contains recurring units which may be considered as residues of N-(perfluorocaproyl)-aziridine.

When cotton cloth is padded with the above solution of fluorinated polymer, dried and heated for about 15 minutes at about 120° C. it is found that the cloth is thereby rendered repellent to oils, for example, ordinary cooking or salad oil.

*Example 13*

To an ice cold (about 3° C.) solution of 0.25 mole of anhydrous potassium carbonate in 300 parts of water containing 0.3 mole of ethylenimine is added a solution of 0.2 mole of N-ethyl-2-perfluorooctanesulfonamido-acetyl chloride in about 500 volumes of chloroform. Stirring is continued permitting the temperature to rise to about 20° C. for 3 hours. The chloroform layer is separated, washed with water and dried and the chloroform evaporated to give N-ethyl-2-perfluorooctanesulfonamido acetaziridide melting about 80° C. After recrystallization from cyclohexane the melting point is about 80.5° to 81.5° C.

*Analysis.*—Calculated for $C_{14}H_{11}O_3SN_2F_{17}$; 52.9% F; 4.59% N. Found: 52.7% F; 4.59% N.

When the above procedure is repeated employing the acid halides of N-propyl-2-perfluorooctanesulfonamido acetic acid, N-methyl-2-perfluorobutanesulfonamido acetic acid and N-ethyl-11-perfluorododecanesulfonamide undecanoic acid, there are obtained, respectively, (N-propyl-2-perfluorooctanesulfonamido)-acetaziridide, (N-methyl-2-perfluorobutanesulfonamido) - acetaziridide and (N-ethyl-11-perfluorododecanesulfonamido) - undecanoyl aziridine.

When the above monomeric aziridides or acyl aziridines are applied to cloth such as cotton jeans cloth as solutions in benzene, methanol or other solvent and dried and polymerized by heating, for example, at 120° C. for 15 minutes, the cloth is found to be oil- and water-repellent.

When each of the above monomers is heated, without application to a fibrous substrate, it is found to produce a solid polymer.

What is claimed is:
1. A compound having the formula:

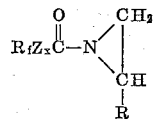

wherein $R_f$ represents a perfluoroalkyl radical, $x$ is 0 to 1, R is a member of the group consisting of hydrogen and lower alkyl radicals, and Z is a divalent linking group of the class consisting of:

$$-(CH_2)_n-, \quad -CH_2-CHCl(CH_2)_m-$$
$$-O-(CF_2)_2-, \quad -CF=CR'_f, \quad -CR'_fH-$$

and $$-SO_2-NR''-(CH_2)_m-$$

wherein $R'_f$ is a member of the group consisting of lower perfluoroalkyl radicals and fluorine, $R''$ is a member of the group consisting of hydrogen and lower alkyl radicals, $n$ is an integer from 3 to 14 and $m$ is an integer from 1 to 12.

2. Perfluoroalkanolyl aziridides of the formula:

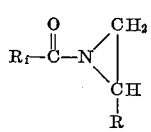

wherein $R_f$ represents a perfluoroalkyl radical having from 3 to 17 carbon atoms and R is a member of the group consisting of hydrogen and lower alkyl radicals.

3. N-(perfluorobutyryl)aziridine.
4. N-(perfluorocapryloyl)-aziridine.
5. A solid polymer comprising recurring units represented by the formula:

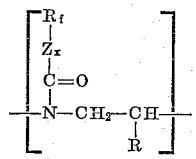

wherein $R_f$ represents a perfluoroalkyl radical, $x$ is 0 to 1, R is a member of the group consisting of hydrogen and lower alkyl radicals, and Z is a divalent linking group of the class consisting of:

$$-O-(CF_2)_2-, \quad -CF=CR'_f-, \quad -CR'_fH-$$
$$-O-(CF_2)_2-, \quad -CF=CR'_f-, \quad -CR'_fH-$$

and $$-SO_2-NR''-(CH_2)_m-$$

wherein $R'_f$ is a member of the group consisting of lower perfluoroalkyl radicals and fluorine, $R''$ is a member of the group consisting of hydrogen and lower alkyl radicals, $n$ is an integer from 3 to 14 and $m$ is an integer from 1 to 12.

6. As an article of manufacture, fibrous web having an oil- and water-resistant finish consisting essentially of a firmly adherent deposit of a polymer comprising recurring units represented by the formula:

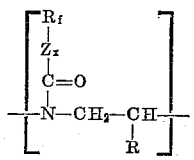

wherein $R_f$ represents a perfluoroalkyl radical, $x$ is 0 to 1,

R is a member of the group consisting of hydrogen and lower alkyl radicals, and Z is a divalent linking group of the class consisting of:

$$-(CH_2)_n-, -CH_2-CHCl(CH_2)_m-$$
$$-O-(CF_2)_2-, -CF=CR'_f-, -CR'_fH-$$

and $$-SO_2-NR''-(CH_2)_m-$$

wherein $R'_f$ is a member of the group consisting of lower perfluoroalkyl radicals and fluorine, $R''$ is a member of the group consisting of hydrogen and lower alkyl radicals, $n$ is an integer from 3 to 14 and $m$ is an integer from 1 to 12.

References Cited by the Examiner

UNITED STATES PATENTS

| | | | |
|---|---|---|---|
| 2,272,489 | 2/42 | Ulrich | 260—239 |
| 2,296,226 | 9/42 | Ulrich | 260—239 |
| 2,502,478 | 4/50 | Padbury et al. | 260—239 |

OTHER REFERENCES

Joullie: Am. Chem. Soc. J. 77, 6662–63 (1955).

MURRAY TILLMAN, *Primary Examiner.*

LOUISE P. QUAST, *Examiner.*

UNITED STATES PATENT OFFICE
CERTIFICATE OF CORRECTION

Patent No. 3,198,754                                  August 3, 1965

Arthur H. Ahlbrecht et al.

It is hereby certified that error appears in the above numbered patent requiring correction and that the said Letters Patent should read as corrected below.

Column 10, line 52, for "$-O-(CF_2)_2-$, $-CF=CR'_f-$, $-CR'_fH-$" read -- $-(CH_2)_n-$, $-CH_2-CHCl(CH_2)_m-$ --.

Signed and sealed this 8th day of March 1966.

(SEAL)
Attest:

ERNEST W. SWIDER                               EDWARD J. BRENNER
Attesting Officer                                   Commissioner of Patents